United States Patent [19]
Gretz

[11] Patent Number: 5,693,910
[45] Date of Patent: Dec. 2, 1997

[54] EASY-INSERTION INTEGRALLY HINGED C-SHAPED CONNECTOR

[75] Inventor: Thomas J. Gretz, Summit, Pa.

[73] Assignee: Arlington Industries, Inc., Scranton, Pa.

[21] Appl. No.: 744,055

[22] Filed: Nov. 5, 1996

Related U.S. Application Data

[63] Continuation-in-part of Ser. No. 316,839, Oct. 3, 1994, abandoned, which is a continuation-in-part of Ser. No. 55,734, Apr. 30, 1993, Pat. No. 5,442,141.

[51] Int. Cl.[6] .................................................... H02G 3/18
[52] U.S. Cl. .............................. 174/65 G; 174/153 G; 248/56
[58] Field of Search .......................... 174/65 R, 65 G, 174/151, 152 G, 153 G, 135; 285/921, 162, 215, 216; 248/56; D8/356; 16/2.1, 2.2

[56] References Cited

U.S. PATENT DOCUMENTS

| Re. 23,720 | 10/1953 | Gillespie | 285/162 |
|---|---|---|---|
| D. 251,781 | 5/1979 | Hutton | D13/24 |
| 2,458,409 | 1/1949 | Paige | 285/162 |
| 2,564,341 | 8/1951 | Paige | 285/162 |
| 2,706,647 | 4/1955 | Gillespie | 285/162 |
| 4,192,477 | 3/1980 | Decky et al. | 248/56 |
| 4,299,363 | 11/1981 | Datschefski | 174/65 G X |
| 4,919,370 | 4/1990 | Martin et al. | 248/56 |
| 5,118,057 | 6/1992 | Martin et al. | 248/56 |
| 5,374,017 | 12/1994 | Martin et al. | 248/56 |

*Primary Examiner*—Kristine L. Kincaid
*Assistant Examiner*—Dean A. Reichard

[57] ABSTRACT

This invention relates to electrical connectors, specifically to an electrical connector that is easy to insert into a hole or knock-out of an electrical junction box. Design of the connector provides for positive fixture of the connector in the box once non-metallic sheathed cable, either oval or circular in cross-directional shape, is inserted through the connector, thus preventing the cable from being withdrawn. The C-shaped one piece connector of this disclosure contains an integral hinge, a cutout area, and a necked down area on the top flange to provide for easy flexing about the central insertion axis and therefore easy insertion into an electrical junction box. The jaws of the electrical connector are designed such that a positive bite or grip is applied to an oval or circular non-metallic sheathed cable as tension is applied on the cable to attempt to remove it from the electrical junction box.

10 Claims, 9 Drawing Sheets

EASY-INSERTION INTEGRALLY HINGED C-SHAPED CONNECTOR

This is a continuation-in-part of U.S. patent application, Ser. No. 08/316,839, filed Oct. 3, 1994, now abandoned, which is a continuation in part of U.S. patent application Ser. No. 08/055,734 filed Apr. 30, 1993 (now U.S. Pat. No. 5,442,141).

FIELD OF THE INVENTION

This invention relates to electrical connectors, specifically to an electrical connector that is easy to insert into a hole or knock-out in an electrical junction box. Typically, force must be applied to existing commercially available electrical connectors, sometimes involving the use of a hammer or screwdriver, to insert the connector into a junction box. This particular invention relates to an improved C-shaped connector that contains an integral hinge or hinges to facilitate easy flexing of the connector, thereby effectively reducing the outside diameter of the connector and allowing easy insertion into a hole or knock-out of a typical junction box.

BACKGROUND OF THE INVENTION

Typically, non-metallic sheathed cable is attached to electrical junction boxes by either of two general methods. The classical method of connecting said non-metallic sheathed cable to an electrical junction box is by inserting a circular, threaded metal connector through a hole or knock-out in the junction box, mating the exposed end of the connector inside the box with a threaded flange, tightening the threaded flange against the connector and thus tightly to the wall of the junction box, inserting said non-metallic sheathed cable, orienting said cable in the proper orientation if it has an oval cross-directional shape, and then tightening two screws that draw together a bracket that is an integral part of said connector causing the bracket to draw together around said cable and lock it in place.

The second general method of attaching non-metallic sheathed cable, either circular or oval in cross-directional shape, employs quick connect type fittings that are pushed into the hole in the junction box either prior to the insertion of said cable or are inserted after being affixed onto the cable with the connector and cable then inserted together.

U.S. Design Pat. No. 251,781 shows a quick connect electrical connector that has a cutout area in its circumference as does the invention of this disclosure. This connector is difficult to use because it is hard to squeeze to a sufficiently small circumference to allow easy insertion in the hole or knock-out of an electrical junction box. The hinge and notched area of the top flange of this invention, which is an improvement to D-251,781, enable far easier insertion in a junction box with gentle pressure applied with one hand.

The connector of U.S. Pat. No. 4,299,363 consists of four equally sized tabs for gripping the wall of a junction box. Enough force must be exerted to overcome the resistance provided by the four tabs. There is no hinge in the outer perimeter of the connector, no necked down area to assist in the flexing of the connector and it is mentioned in '363 that insertion in the hole of a junction box "may be facilitated when necessary by a light tapping action" on the side of the connector "with a hammer where the sizing of the knock-out opening is somewhat smaller than will accommodate finger pressure application of the connector to the box knock-out opening".

U.S. Pat. Nos. 4,919,370 and 5,118,057 refer to connectors that are substantially different than the connector of this disclosure, being designed to be installed partially into a knock-out of a junction box prior to inserting the cable, and then installed completely once the cable has been inserted. There are many more steps involved than the simple finger pressure assisted installation of this invention. Both U.S. Pat. Nos. 4,919,370 and 5,118,057 mention that the external portion of the fitting may be adapted to provide a "rear-end striking surface" in one variation, another variation with "rearward facing screwdriver slots" to enable driving the fitting securely into the box with a screwdriver, and another variation in which the fitting may be affixed to the panel and locked by compression of gripping arms by an "ordinary pair of channeled adjustable pliers".

This disclosure thus improves all of the aforementioned prior art by providing a simple, one-piece moldable electrical connector that is flexible enough in its design to allow easy one hand insertion in the knock-out of a junction box while also providing one-way restraint of the cable at the junction box wall to prevent forceful removal therefrom.

SUMMARY OF THE INVENTION

This invention relates to electrical connectors, specifically to an electrical connector that is easy to insert in a hole or knock-out of an electrical junction box. The connector can easily be inserted with one hand by applying a slight squeezing pressure to the outer diameter of the connector. The features of the connector that allow it to easily enter the junction box hole are the flexible material of construction, a cutout area in the outer circumference of the connector to make it a C-shaped body, an integral hinge or hinges that are spaced at such an angle from said cutout to allow easy collapsing of the outer diameter of the connector, and a cut-out area on the top flange or slat.

Once the connector of this disclosure is inserted into the junction box and finger pressure is released, the connector springs back or nearly back to its original diameter, thereby holding the connector in the box. Non-metallic sheathed cable, either circular or oval in cross-sectional shape, can then be inserted through the connector to the desired position. The connector contains jaws that are designed such that a positive yet non-abrasive bite or grip is applied on said cable when tension is applied to it in an attempt to remove it from said enclosure. Once inserted, the cable is therefore restrained by the connector and is held firmly in the junction box.

OBJECTS AND ADVANTAGES

Accordingly, several objects and advantages of this invention are:

(1) to provide a one-piece C-shaped electrical connector that is easy to insert in a hole or knock-out of an electrical junction box.

(2) to provide a connector that easily centers itself in the hole of a junction box.

(3) to provide a connector that is flexible enough to be easily reduced in outer diameter by a gentle squeezing pressure applied with one hand, allowing the connector to easily slip into the hole and then stay there once pressure is released.

(4) to provide a connector that applies a firm yet non-abrasive bite or grip on the heretofore inserted cable, so that the cable is thereby restrained when tension is applied on the cable in an attempt to pull it out of the junction box.

DESCRIPTION OF THE INVENTION

The figures are intended to illustrate typical examples of the embodiments of this invention, an easy insertion connector for connecting non-metallic sheathed cable to electrical junction boxes.

Figure 1:
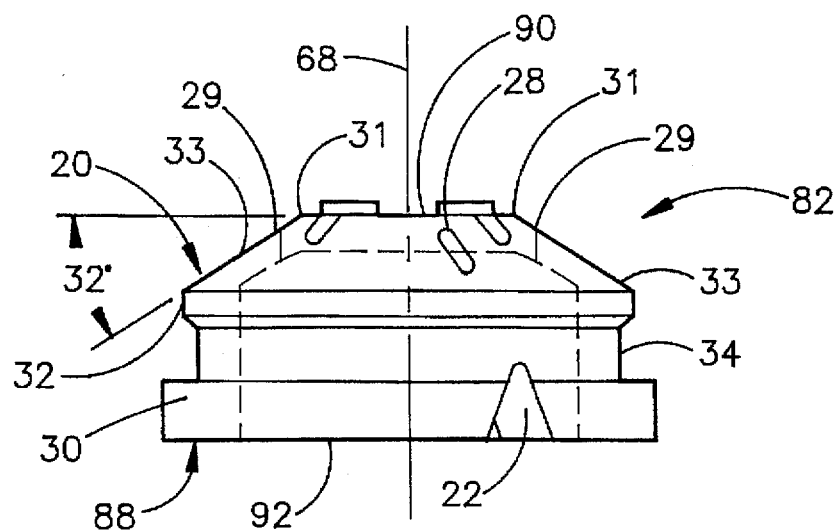
FIG. 1 is a side view of a first embodiment of the easy-insertion connector of this invention showing the notch and showing the inboard end at the top of the figure and the outboard at the bottom of the figure.

A first embodiment of the connector of this invention, indicated by reference numeral 20 in FIG. 1, is a one-piece C-shaped connector having a hollow body of resilient flexible material with an outboard end 92 and an inboard end with a passageway therethrough. The connector has two gripper jaws 24 that are spaced equidistant around central axis 68 with an outer conical surface 82 sloped typically 32° from a plane perpendicular to central axis 68, the arrangement and design of which provide easy centering of said connector 20 in an appropriate knock-out in an electrical junction box.

Ease of insertion of the connector 20 in an appropriately sized knock-out is facilitated in part by a notch 22 which is depicted in the body of connector 20 in FIG. 1. The notch 22 is V-shaped and extends through the base flange 30 of said connector 20 and partly into the seat 34. The seat is the portion of connector 20 that will be in intimate contact with the wall or panel of a junction box when connector 20 is affixed thereto. The base flange 30 has a diameter greater than the opening in the panel and is formed of two arcuate parts 94 and 96 with each part having a first facing end 98 and a second facing end 100.

Figure 2:
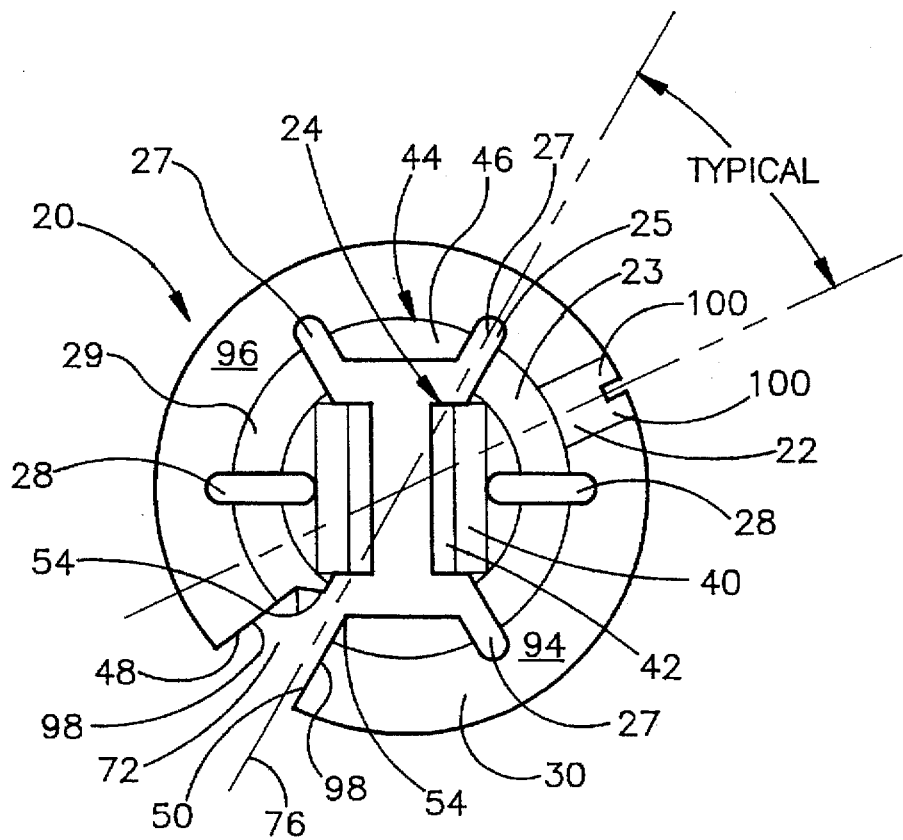
FIG. 2 is the end view of the first embodiment viewed from the outboard end, or in relationship to FIG. 1 is a view from the bottom of FIG. 1 looking up.
Figure 3:
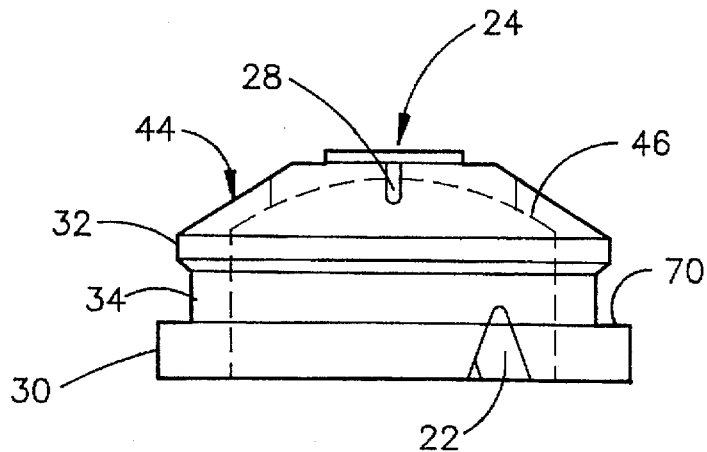
FIG. 3 is a side view of the first embodiment shown in FIG. 2.
Figure 8:
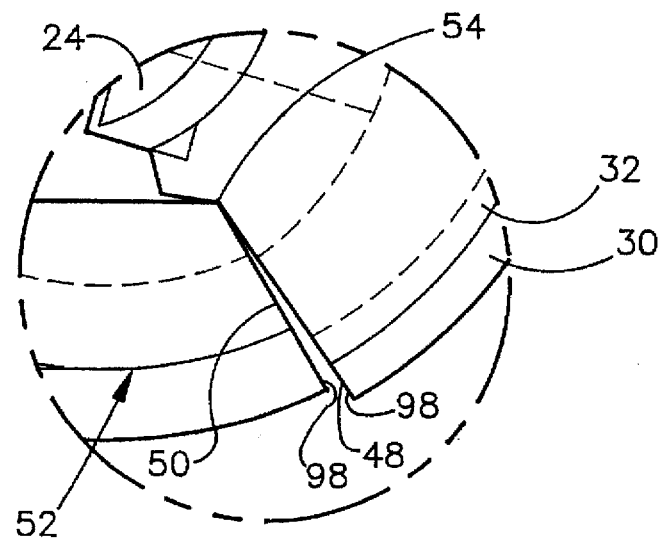
FIG. 8 is an enlarged view of a portion of FIG. 4, showing the collapsed portion of the connector as it is collapsed for insertion into a hole or knock-out of a junction box.
Figure 9:
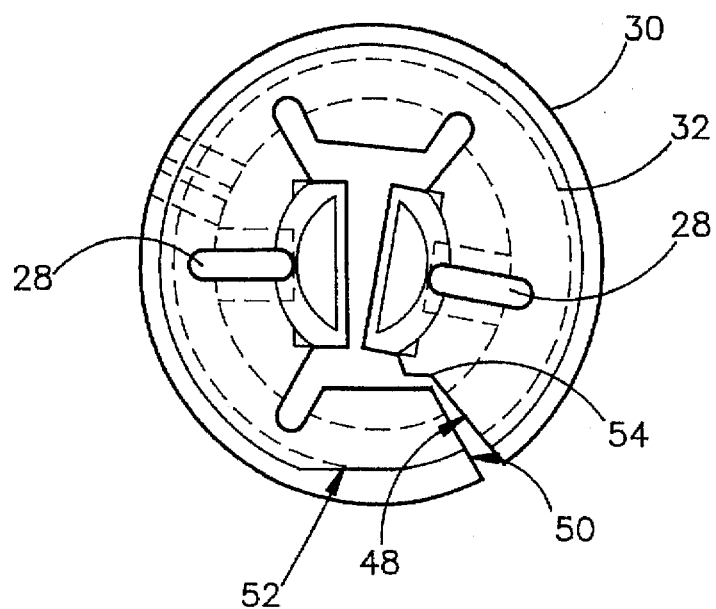
FIG. 9 is a view similar to FIG. 8, showing the collapsed position of the first embodiment as it is collapsed for insertion into a hole or knock-out of a junction box.

The notch 22 works in conjunction with a second feature of the connector of this disclosure which is the cutout 72 depicted in FIG. 2. This drawing, showing the connector 20 from the outboard end or the end that will be outside the junction box once it is applied thereto, depicts the notch 22 in its spatial relationship to cutout 72. The combined action of the notch 22 and cutout 72 creates a hinge 23 to enable easy flexing of connector 20, causing the opposing edges of the cutout to close together. The hinge 23 is an area in the wall of the connector between the bottom of notch 22 and the outer end 25 of the nearest of the two openings 27 and slot 28 which is the path of least bending resistance. The opposing edges of said cutout 72 are formed with a straight edge 50 and an angled edge 48, allowing the opposing surfaces to close together without structurally weakening said connector 20. As shown in FIG. 8, straight edge 50 will close toward angled edge 48 until they contact at mating point 54. By having angled edge 48, the connector is thus prevented from over collapsing as pressure is applied to its outer circumference.

Figure 4:
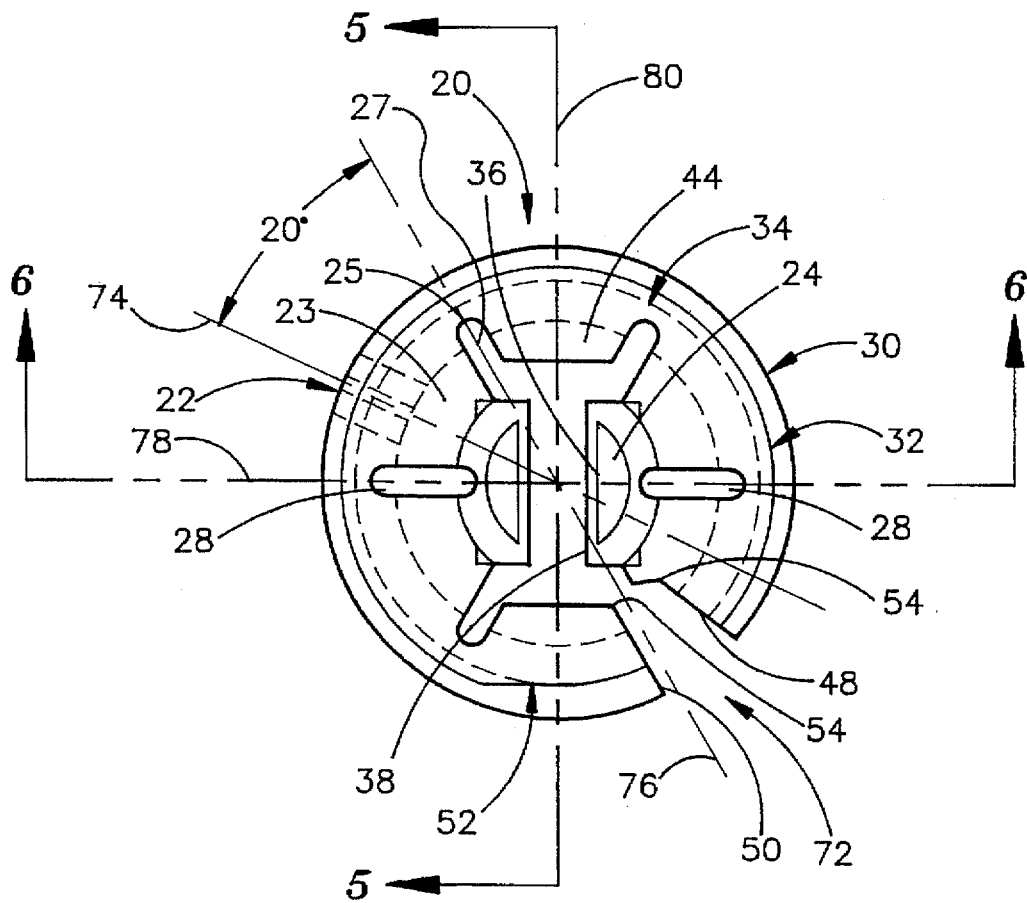
FIG. 4 is an end view of the first embodiment viewed from the inboard end of the connector.

The design of the cutout 72 allows an effective reduction in the outer diameter of the connector 20 along plane 76 as shown in FIG. 2. The beneficial effects of this reduction in outer diameter can best be explained by referring to FIG. 4, which is an end view of the invention from the insertion end of said invention. Collapsing the connector 20 causes a reduction of the outer diameter defined by the edge of the top flange or inner flange 32 such that the effective diameter is reduced along the plane 78 centered through the slots 28 in the gripper jaws 24 effectively from ⅞ to ¹³⁄₁₆ inch. As shown in FIG. 4, notch 22 is located on the opposite side of connector 20 and is spaced typically 20° apart from the plane that bisects cutout 72. This is depicted on the drawing by the angle between plane 74 which bisects notch 22 and plane 76 which bisects cutout 72. The notch 22 and hinge 23 are in the opposite half of the hollow one piece C-shaped round body from the cutout 72.

The notch 22 also works in conjunction with a third feature of the connector 20 of this disclosure which is the necked down area 52 of top or inner flange 32 as shown in FIG. 4. As finger pressure is applied to the outer circumference of connector 20, the effective diameter of the top flange 32 is reduced along plane 80 typically from ⅞ to ¹³⁄₁₆ inch. Hinge 23 typically becomes the pivot point about which the surrounding connector 20 collapses. The necked down area 52 of top flange 32 and the pivot action around hinge 23 are valuable in reducing the outside diameter of top flange 32 along both plane 78 and plane 80. This combined two-directional collapsing of the outer diameter of top flange 32 enables the easy insertion of connector 20 into the knock-out of an electrical junction box. The standard size knock-out in a typical electrical junction box for a connector of the dimensions described here is approximately ²⁷⁄₃₂ inch in diameter.

The gripper jaws 24, as depicted in FIG. 2, are each supported by an angled support 29 having an inboard end 31 and an outboard end 33. Each angled support 29 contains a slot 28 that adds flexibility to the gripper jaw 24 and angled support 29 when a cable is being inserted through the connector 20. The slot allows the gripper jaw 24 to flex outwardly to accommodate the cable, while still allowing enough stiffness for gripper jaw 24 to apply a strong restraining grip when tension is applied in an attempt to remove said cable from said junction box. The angle of the support 29 is formed as part of the outer conical surface 82.

Figure 6:
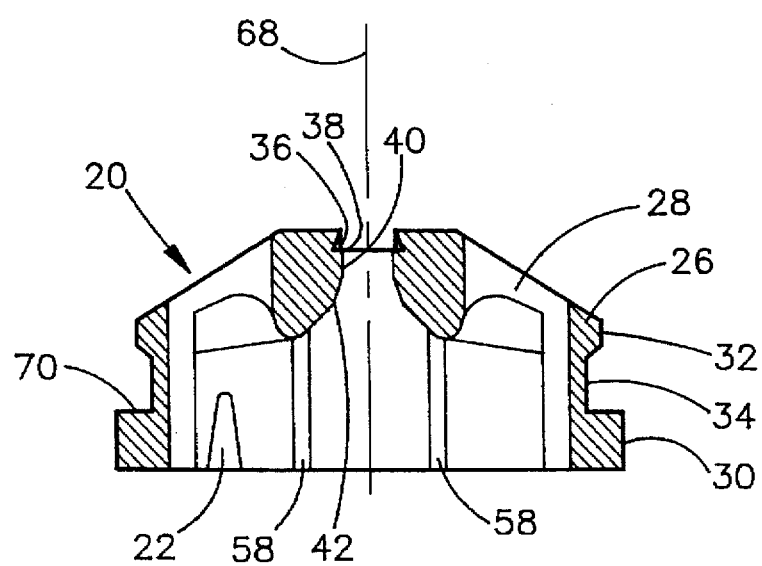
FIG. 6 is a cross-sectional view along section 6—6 of FIG. 4 or along section 6—6 of FIG. 12.

The edges of the gripper jaws 24, as depicted in the cross-sectional view shown in FIG. 6, are designed with an indented edge 36. The gripper jaws 24 typically spread apart when non-metallic shielded cable is inserted along central axis 68 with the cable contacting the first angled surface 42 on the underside of the gripper support 29. Further insertion causes the second angled surface 40 to also come into contact with the cable. After the cable is inserted as far as desired, tension may be applied to the cable in the opposite direction, or away from the box. This action causes gripper edge 38 to bite into the cable and lock it in place. The bite or grip caused by gripper edge 38 of gripper jaws 24 is non-abrasive as a result of the resilient material of construction of connector 20, and does not tear, abrade, or puncture the shield of said cable. The cable is however securely locked inside the junction box by this action.

Figure 5:
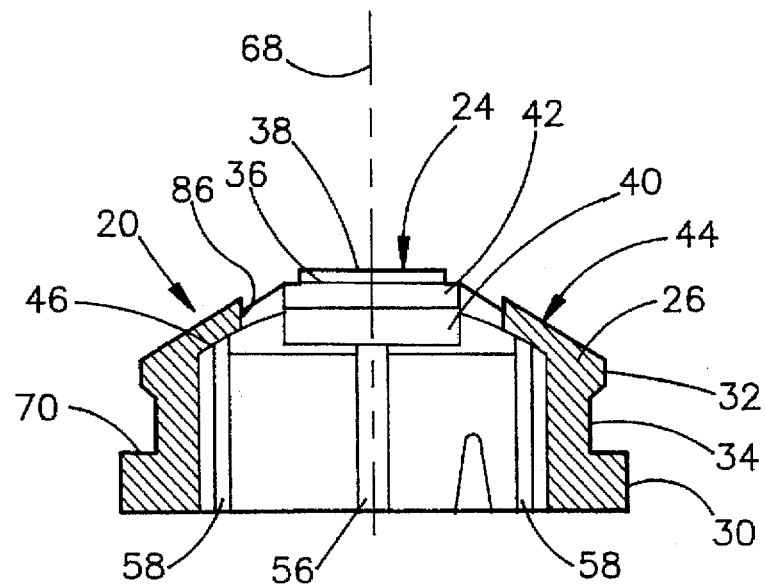
FIG. 5 is a cross-sectional view along section 5—5 of FIG. 4 or along section 5—5 of FIG. 12.

As depicted in FIG. 5, a cross-sectional view of the centering jaws 44 show angled surface 46 interior of connector wall 26 and surface 86 parallel to central axis 68. In operation, as a cable is pushed through connector 20, centering jaws 44 typically do not spread to allow the cable to pass. Centering jaws 44 function to provide centering of the cable, while not impeding its passage. This may be a rough centering action, depending on the gauge of the cable being inserted, as some gauges will not extend entirely from one centering jaw 44 to the other and in this case one centering jaw 44 acts to push the cable farther toward the central axis 68. The cable, whether circular or oval in cross sectional shape, does not have to be exactly centered in order for the invention to perform its task of locking the cable in place.

Figure 10:
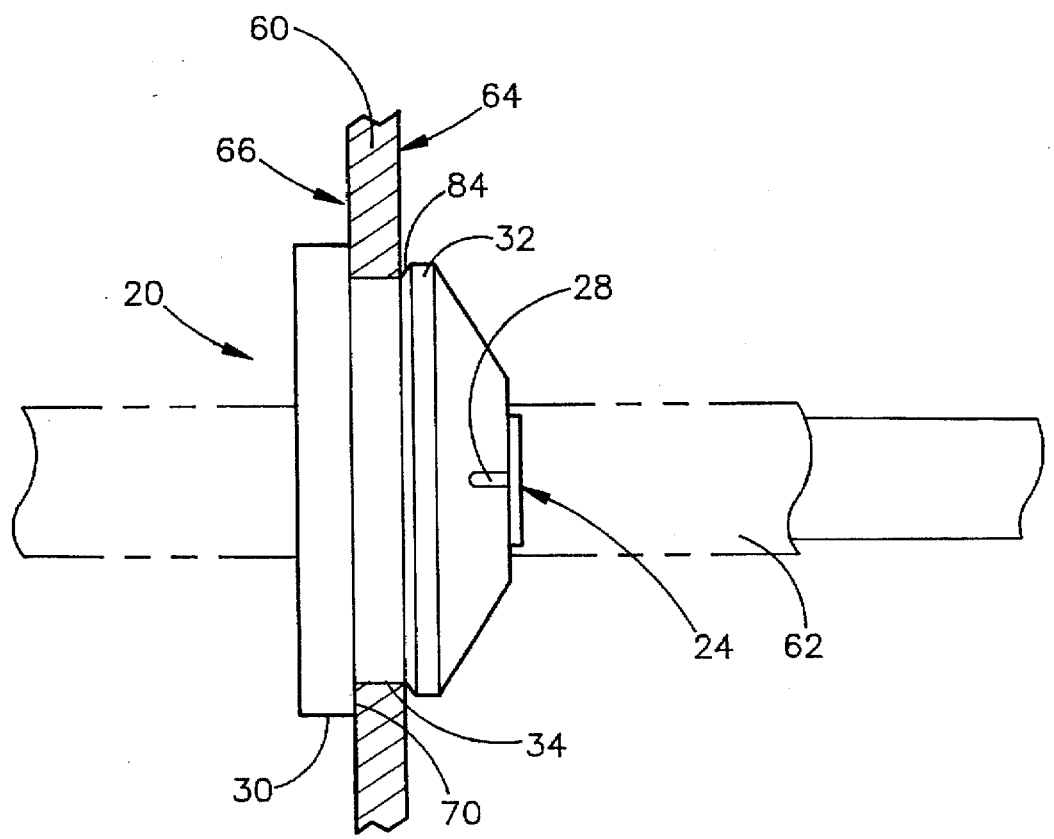
FIG. 10 is a side view showing the connector of this invention inserted through a hole or knock-out of a typical junction box with a non-metallic sheathed cable inserted through the connector.

The connector 20 is depicted fully installed in the knockout of a typical junction box wall 60 in FIG. 10. A circular non-metallic sheathed cable 62 is depicted inserted through the connector 20. Connector 20 is typically inserted until base flange 30 contacts the outboard junction box wall 60 at abutment edge 70. The seat 34 of connector 20 rests on the surrounding junction box wall 60. After insertion, abutment edge 70 is flush with the outboard surface 66 of the junction box wall 60 and top flange 32 with rounded lip 84 may or may not be contacting the inboard surface 64 of the junction box wall 60, depending on the wall thickness of the box. The seat 34 is approximately the same diameter as the opening in the panel of the box and is of a width equal to or greater than the thickness of the panel.

The connector 20 is therefore adaptable to several different wall thicknesses and to several different gauges of non-metallic sheathed cable 62. Once tension is applied to non-metallic sheathed cable 62 in an attempt to pull it out of the box, base flange 30 may be pulled slightly away from exterior surface 66, but only as far as the rounded lip 84 of top flange 32 will allow. Reverse tension does not have to be applied to cable 62 to make the connector 20 secure in the junction box, but if reverse tension is ever applied to the cable, it will be positively restrained once rounded lip 84 contacts the interior surface 64 of the junction box. Therefore the cable 62 is essentially secure after insertion, and does not require reverse tension to be applied to make it so.

Figure 7:
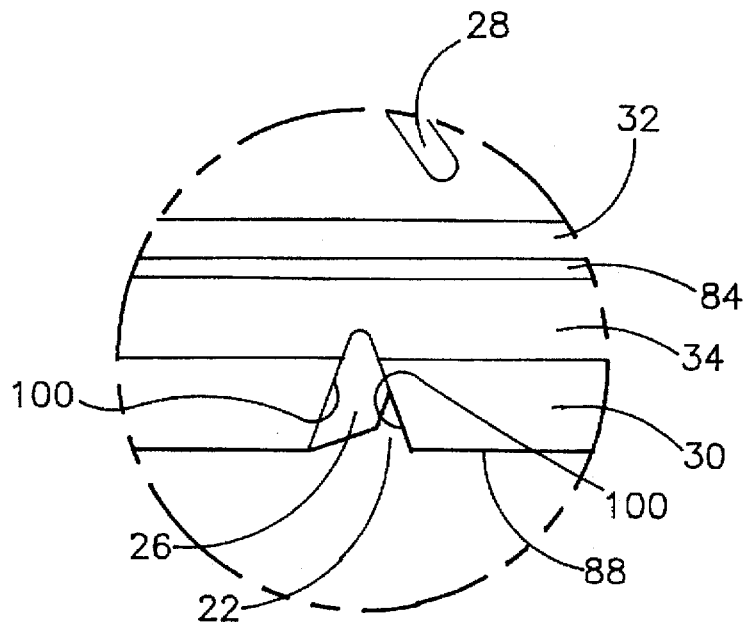
FIG. 7 is an enlarged view of a portion of FIG. 1, showing the notch.

As depicted in FIG. 7, notch 22 is cut completely through the wall of the connector and extends form the base 88 of the connector completely through base flange 30 and partially across seat 34. This provides a hinge 23 that is sized such that the proper flexibility is provided to the connector to allow it to collapse easily for insertion into the knock-out of a junction box.

Depicted in FIG. 5 are two jaw grooves 58 in the interior surface of connector wall 26 that define the jaws, both the gripper jaws 24 and centering jaws 44. A slot groove 56 also is depicted in connector wall 26 extending from slot 28. The grooves are cut into connector wall 26 to add desired flexibility to the connector while at the same time maintaining structural integrity of the connector 20.

Figure 11:
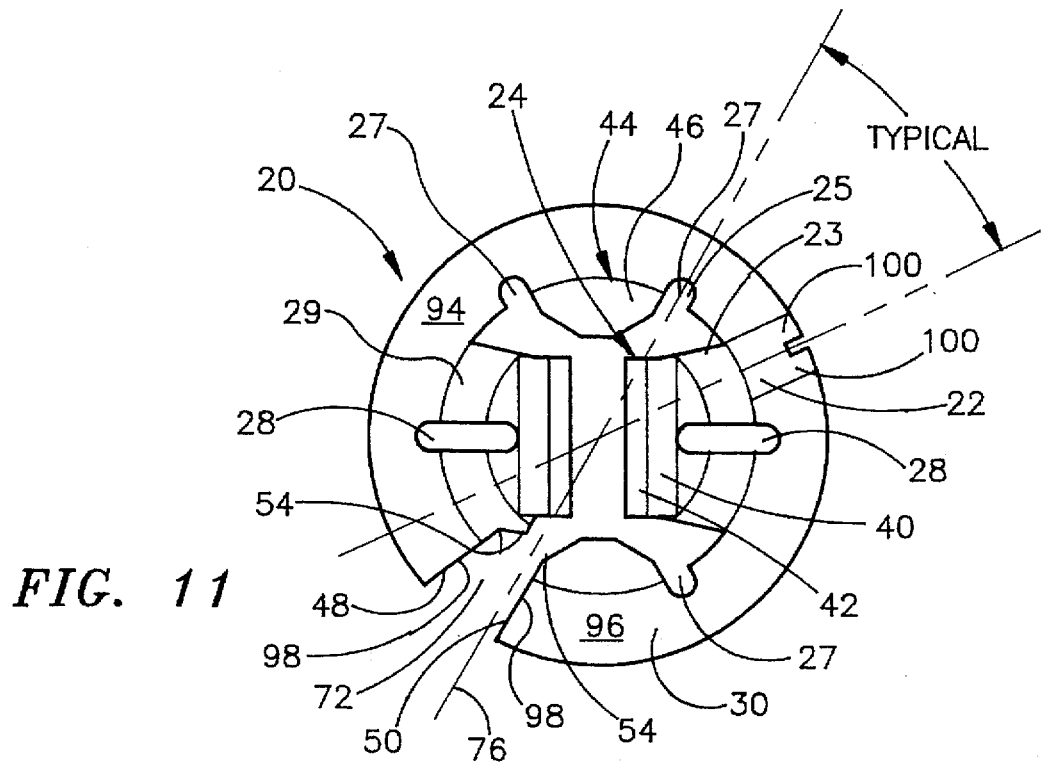
FIG. 11 is an end view of a second embodiment of the invention viewed from the outboard end.

A second embodiment of the present invention viewed from the outboard end is shown in FIG. 11. In the second embodiment, the partial openings 27 are wider than for the first embodiment shown in FIG. 1. The partial opening is made by reducing material from the gripper jaw side 21 of the opening 27 so that the sides are almost perpendicular to the plane 80 centered through the opening between the gripper jaws 24. This makes the jaw sides 21 on each side of a jaw and the inner part of angled support 29 approximately parallel to each other. Thus, when the opening between the gripper jaws 24 is widened by a cable being pushed through they bend open by the bending of the angled support 29. The angled support 29 bends more easily in the embodiment of FIGS. 11 and 12 since its width has been reduced by the removal of material to make the jaw sides 21 approximately perpendicular to plane 80 passing through the opening between the gripper jaws 24. The gripper jaws 24 have straight faces that extend transversely to the jaw sides 21 and thus the jaw sides 21 are approximately perpendicular to the transverse straight faces. A larger opening 27 permits gripper jaws 24 to open more freely when a wire or cable is passed through. Centering jaws 44 have also been extended slightly in this embodiment to aid in centering wires with rectangular cross sections. There is more springing action in the gripper jaws 24 in this embodiment to allow the cable to pass through easier and also to grip the cable better when reverse tension is applied.

Figure 12:
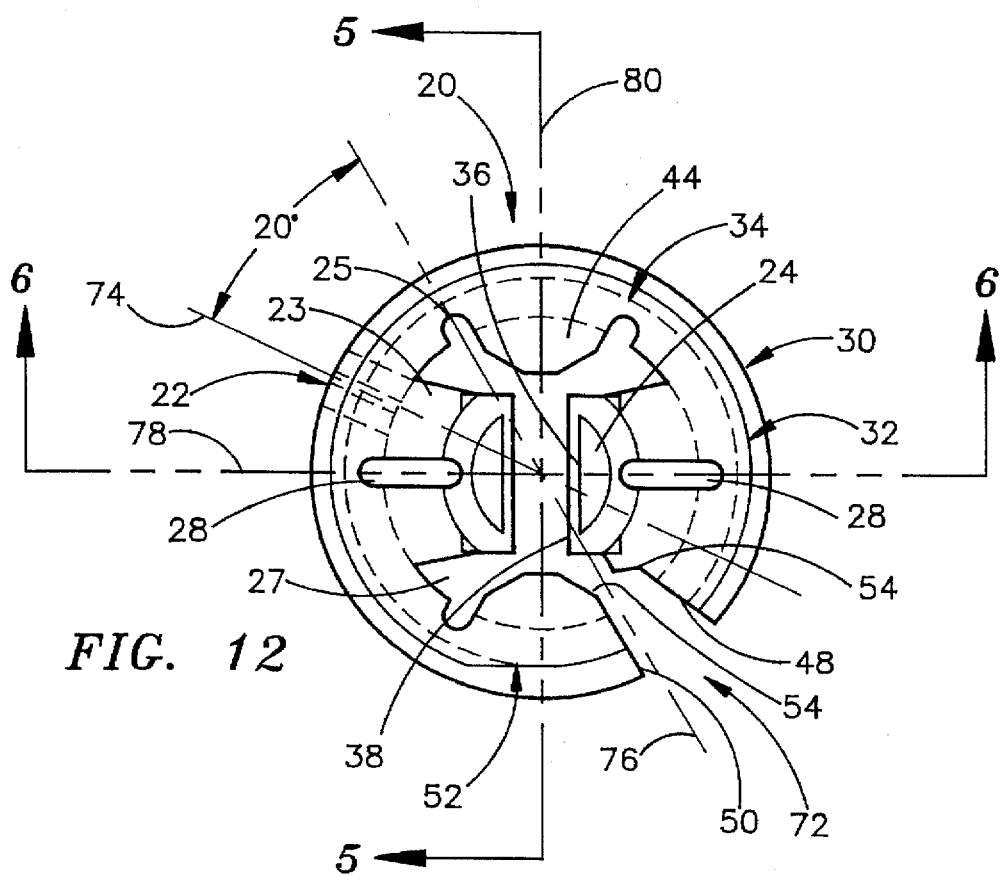
FIG. 12 is an end view of the second embodiment shown in FIG. 11 viewed from the inboard end.
Figure 13:
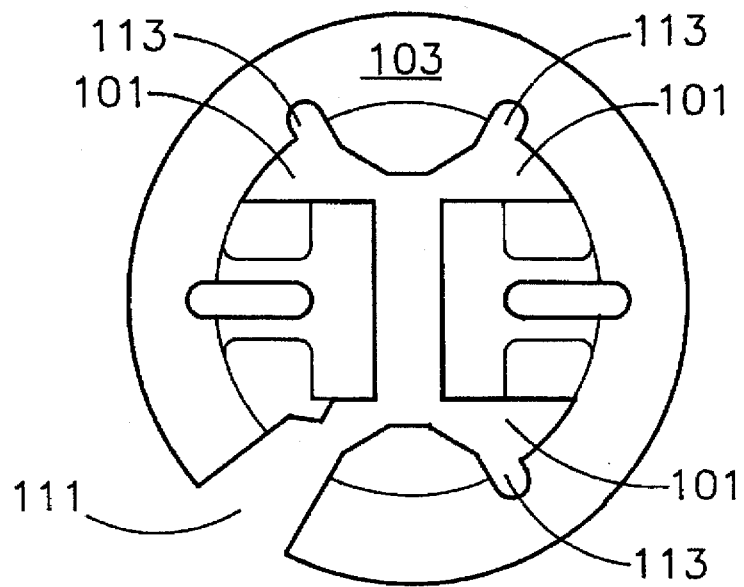
FIG. 13 is an end view of a third embodiment viewed from the outboard end.
Figure 14:
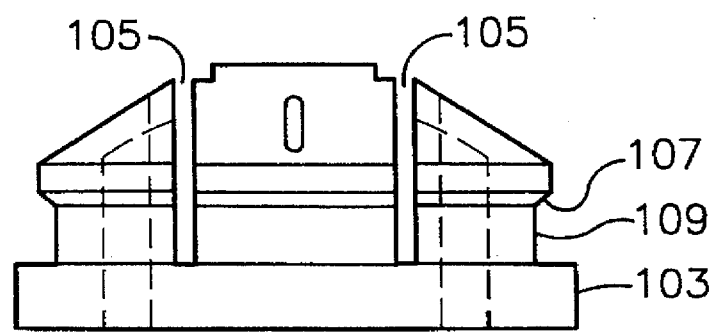
FIG. 14 is a side view of the third embodiment shown in FIG. 13.
Figure 15:
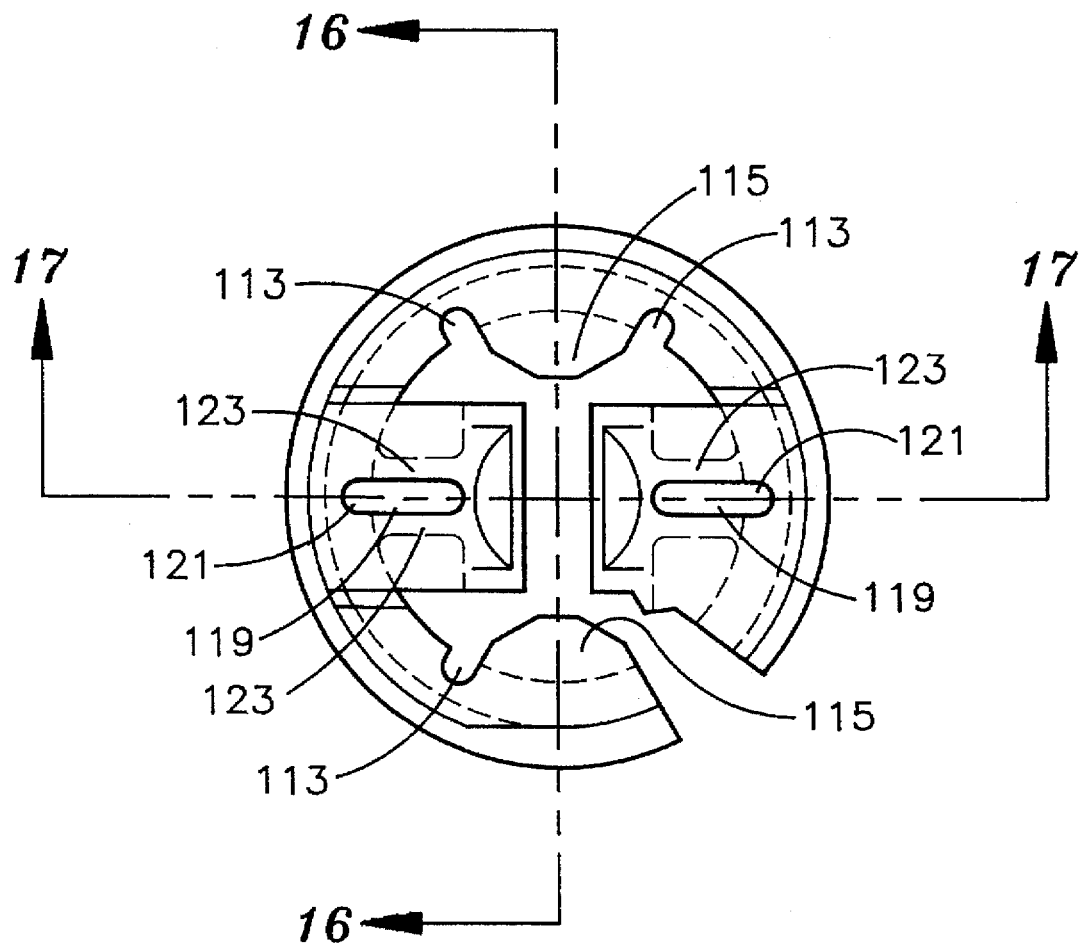
FIG. 15 is an end view of the third embodiment viewed from the inboard end of the connector.
Figure 16:
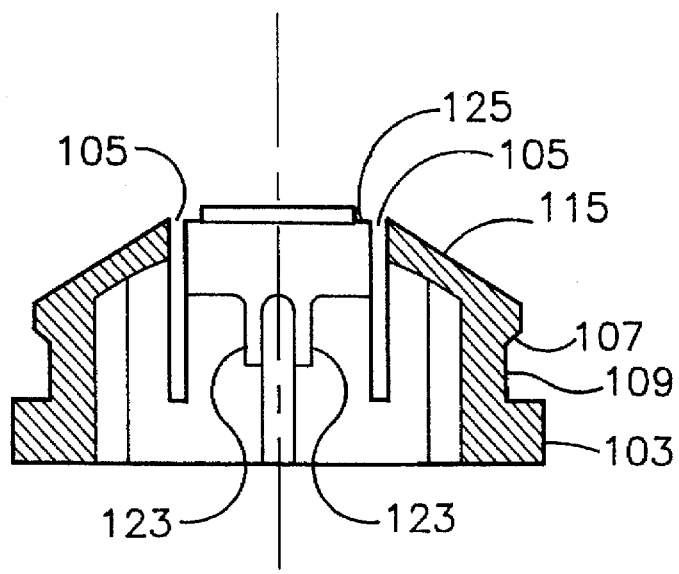
FIG. 16 is a cross-sectional view along section 16—16 of FIG. 15.
Figure 17:
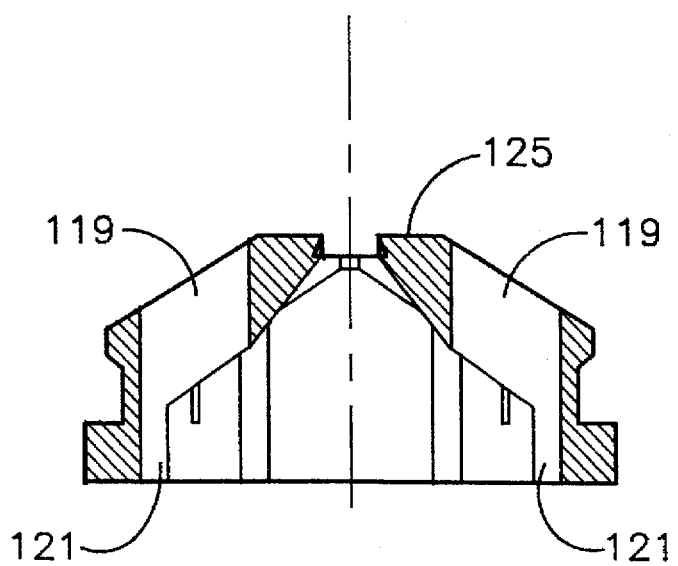
FIG. 17 is a cross-sectional view along section 17—17 of FIG. 15.

The second embodiment is shown in FIG. 12 as viewed from the inboard end of the connector 20. Three openings 27 with the expanded open area so that the jaw sides are approximately parallel to one another are depicted. Centering jaws 44 extend farther than the centering jaws of the 1st embodiment shown in FIG. 4 and extends almost to the opening between the gripper jaws 24. The centering jaws 44 taper inward to a flat end 45 that is approximately parallel to jaw sides 21 and of a width slightly less than the space between the gripper jaws.

A third and preferred embodiment is shown in FIGS. 13 to 17.

This embodiment is similar to the previous embodiments except the partial openings 101 have been increased so that the side walls of the gripper jaws and angled support are perpendicular to the transverse straight faces all the way to the base flange 103. A major difference is changing the notch from the base flange to three notches or slits 105 that are extensions of the partial openings 101 through an inner flange 107 and the seat 109 terminating at said base flange 103. Thus, the notches 105 extend part way through the outboard end of the connector by extending through the seat 109.

The integral hinges are primarily the flexing of the base flange in the area of the termination points of the three notches 105 which permit the connector to close the full opening 111 so that the connector can be inserted into a panel opening.

Also, assisting in the easy closing of the connector about full opening 111 are the inside grooves 113 which are located in the connector's side walls and extend to the end of the outboard end and are positioned in said partial openings 101 adjacent the centering jaws 115.

Also, each angled support includes a slot or elongated hole 119 which extends into a slot extension 121 that partially penetrates the connector's wall and extends to the end of the outboard end. Each side of the slot 119 is a stiffening flange 123.

The third preferred embodiment is much easier to use. Usually, the connector is first placed in the hole of a panel and a wire is then pushed through from the outside. The new embodiment makes it much easier to put the connector in the panel and push the wire thereinto but even permits the insertion of a second wire especially some of the new cables.

The gripper jaws 125 and angled support are cantilevered from the base flange which increases their flexibility for insertion of wire but still retains adequate resistance to the wires being withdrawn.

The material of construction of the connector of this invention is of any suitable plastic material that provides appropriate resilient flexibility and dielectric properties to the connector. One example of such a material is TEXALON 600-A-ZIP-22 sold by Texapol Corporation, 177 Mikron Road, Bethlehem, Pa. 18017. Other suitable materials include NYLON and polyvinyl chloride.

The dimensions cited in this description of the invention are typical dimensions for a connector designed to fit a typical 27/32 inch hole or knock-out of a junction box. This should not be construed as limiting the scope of this invention as the same principles can be applied to design this connector for any size hole or knock-out of a typical junction box.

The above description is given to satisfy the requirements for disclosure of the invention and are not to be construed as limiting the scope of the invention insofar as a person skilled in the art can modify aspects of the disclosure. The scope of the invention is to be construed as limited only by the appended claims and their equivalents.

What is claimed is:

1. A one-piece C-shaped connector for connecting a sheathed electric cable through an opening in a panel, comprising:
    (a) a hollow one piece C-shaped round body of resiliently flexible material having an outboard end, an inboard end, a wall and a passageway surrounded by said wall extending from said outboard end to said inboard end for enclosing the cable;
    (b) two opposed gripper jaws having transverse straight faces with an opening therebetween at said inboard end of said body for gripping said cable;
    (c) a full opening in said wall extending from said outboard end to said inboard end with sufficient width to permit said wall to be circumferentially collapsed sufficiently to permit the inboard end of said body to be inserted in said opening in said panel;
    (d) an angled support having an inboard end and an outboard end for each of said gripper jaws with each of said gripper jaws integrally attached at said inboard end of a corresponding one of said angled supports;
    (e) said gripper jaws and angled supports having sides which are approximately perpendicular to said straight faces of said gripper jaws;
    (f) an opening in said wall adjacent to each of said sides of each of said gripper jaws and angled supports for a total of four openings, with one of said openings being said full opening and the other three openings being partial openings;
    (g) a base flange having two arcuate parts with each arcuate part having a first facing end and a second facing end with said base flange located at said outboard end of said body and having a diameter greater than the diameter of the opening in the panel and with said full opening separating said two arcuate parts between their first facing ends;
    (h) a notch on said outboard end separating said second facing ends of said two arcuate parts of said base flange located on an opposite side of said body from said full opening and extending entirely through said base flange;
    (i) a seat in said outboard end of said body of approximately the same diameter as the diameter and equal or greater width as the thickness of the opening in the panel, said seat having an outboard abutment edge located on an inner side of said base flange;
    (j) an inner flange located on an inboard side of said seat with said inner flange being integrally attached to said seat; and
    (k) an integral hinge in said wall located between said notch and the nearest of said partial openings adjacent to a side of one of said gripper jaws whereby said body can be collapsed by folding about said hinge to close said full opening and decrease an outer diameter of the body sufficiently to be inserted in the opening of the panel.

2. The connector of claim 1, which further includes two centering jaws each adjacent to one of said partial openings, which taper to flat ends located so said flat ends extend approximately parallel to said sides of said gripper jaws and are of a width slightly less than said opening between said gripper jaws.

3. A one-piece C-shaped connector for connecting a sheathed electric cable through an opening in a panel, comprising:
    (a) a hollow one piece C-shaped round body of resiliently flexible material having an outboard end, an inboard end, a wall and a passageway surrounded by said wall extending from said outboard end to said inboard end for enclosing the cable;
    (b) two opposed gripper jaws having transverse straight faces with an opening therebetween at said inboard end of said body for gripping said cable;
    (c) a full opening in said wall extending from said outboard end to said inboard end with sufficient width to permit said wall to be circumferentially collapsed sufficiently to permit the inboard end of said body to be inserted into said opening in said panel;
    (d) an angled support having an inboard end and an outboard end for each of said gripper jaws with each of said gripper jaws integrally attached at said inboard end of a corresponding one of said angled supports;
    (e) said gripper jaws and angled supports having sides which are approximately perpendicular to said straight faces of said gripper jaws;
    (f) an opening in said wall adjacent to each of said sides of each of said gripper jaws and angled supports for a total of four openings, with one of said openings being said full opening and the other three openings being partial openings;
    (g) a base flange located at said outboard end of said body and having a diameter greater than the diameter of the opening in the panel;
    (h) a seat in said outboard end of said body of approximately the same diameter as the diameter and equal or greater width as the thickness of the opening in the panel, said seat having an outboard abutment edge located on an inner side of said base flange;

(i) an inner flange located on an inboard side of said seat with said inner flange being integrally attached to said seat;

(j) a notch extending part way through said outboard end of said body; and (k) an integral hinge in said wall located between said notch and the nearest of said partial openings adjacent to a side of one of said gripper jaws whereby said body can be collapsed by folding about said hinge to close said full opening and decrease an outer diameter of the body sufficiently to be inserted in the opening of the panel.

4. The connector of claim 3 which further includes two centering jaws each adjacent to one of said partial openings, which taper to flat ends located so said flat ends extend approximately parallel to said sides of said griper jaws and are of a width slightly less than said opening between said gripper jaws.

5. The connector of claim 3 wherein said notch is at least one notch provided by an extension of at least one of said partial openings and extends through said inner flange and said seat but not through said base flange.

6. The connector of claim 3 wherein said notch extends through said base flange but not through said seat and said inner flange.

7. The connector of claim 5 wherein said at least one notch comprises three notches which result in said gripper jaws being cantilevered from said base flange.

8. The connector of claim 7 which further includes two centering jaws each adjacent to one of said partial openings, which taper to flat ends located so said flat ends extend approximately parallel to said sides of said gripper jaws and are of a width slightly less than said opening between said gripper jaws.

9. The connector of claim 8 wherein said notches are located within said partial openings next to said gripper jaws and said connector further includes as an extension of each of said partial openings an inside groove within said partial opening adjacent to one of said centering jaws which groove extends to said outboard end.

10. The connector of claim 9 which further includes:

a slot located in each of said angled supports;

a slot extension in the form of an additional inside groove extending from each said slot to said outboard end; and a stiffening flange on each side of said slot.

* * * * *